United States Patent
Ameling et al.

(10) Patent No.: US 9,923,893 B2
(45) Date of Patent: Mar. 20, 2018

(54) SIMPLIFIED IOT SERVICES FOR CLOUD ENVIRONMENTS

(71) Applicant: SAP SE, Waldorf (DE)

(72) Inventors: Michael Ameling, Dresden (DE); Christof Momm, Dresden (DE)

(73) Assignee: SAP SE, Walldorf (DE)

( * ) Notice: Subject to any disclaimer, the term of this patent is extended or adjusted under 35 U.S.C. 154(b) by 407 days.

(21) Appl. No.: 14/686,028

(22) Filed: Apr. 14, 2015

(65) Prior Publication Data

US 2016/0308861 A1 Oct. 20, 2016

(51) Int. Cl.
*H04L 29/06* (2006.01)
*G06F 21/44* (2013.01)
*H04L 29/08* (2006.01)

(52) U.S. Cl.
CPC .......... *H04L 63/0876* (2013.01); *G06F 21/44* (2013.01); *H04L 63/0823* (2013.01); *H04L 67/141* (2013.01); *G06F 2221/2117* (2013.01); *G06F 2221/2137* (2013.01)

(58) Field of Classification Search
CPC .................. H04L 41/0843; H04L 41/0886
See application file for complete search history.

(56) References Cited

U.S. PATENT DOCUMENTS

| | | | |
|---|---|---|---|
| 2014/0156820 A1* | 6/2014 | Moineau | H04L 41/0813 709/223 |
| 2016/0248746 A1* | 8/2016 | James | H04L 61/1511 |

\* cited by examiner

*Primary Examiner* — Brian F Shaw
(74) *Attorney, Agent, or Firm* — Jones Day

(57) ABSTRACT

Methods and systems provide management, monitoring, and onboarding of a device, a service, and/or an application in the context of the Internet of Things (IoT). Data may be acquired data for IoT member devices for interpretation. Methods and systems support a variety of devices, including commodity hardware, various protocols, data formats, and data representation. A device adapter package may include a reusable portion and a device-specific portion. At least part of the device adapter package may be stored in a repository. A system may generate adapter code. A target device to be managed and/or on-boarded to an IoT may be configured using the adapter package and adapter code. The adapter code may be provided to the target device, facilitating authentication and registration of the device. The system may then register the device and generate credentials. Upon verification of the device, the device may be onboarded and managed.

20 Claims, 5 Drawing Sheets

200

400

500

600

SIMPLIFIED IOT SERVICES FOR CLOUD ENVIRONMENTS

FIELD OF THE DISCLOSURE

The present disclosure relates to a method and system for maintaining components and connecting components to a network. More specifically, it relates to maintaining and onboarding a device, an application, and/or a service to a cloud in the context of the Internet of Things (IoT).

BACKGROUND

The Internet of Things (IoT) describes the interconnection of computing devices ("IoT member devices") within an Internet infrastructure. A device may be intelligent and represent a real object. Each device within an IoT environment may be uniquely identified, e.g., by an Internet Protocol (e.g., IP) address. IoT may enable a cloud to acquire data from constituent devices to provide additional value for a user. For example, in a smart vending scenario, sensor data may be collected at a location of the vending device and used to offer remote maintenance services. As another example, for health monitoring or diagnostics, data may be collected to provide a recommendation.

A set of IoT member devices maybe heterogeneous, encompassing a variety of applications, domains, and protocols. The devices may vary in their capabilities such as computing power (e.g., RAM, CPU, storage), connectivity (Wi-Fi®, Bluetooth®, ZigBee®, GSM®, Ethernet, etc.), or platform (embedded computing, micro-controller, etc.). It may be challenging to manage and monitor a set of diverse devices involving a variety of applications, domains, and/or protocols.

DETAILED DESCRIPTION

To collect data from a member device of a group of devices connected in the context of IoT, the member device is typically uniquely identified, securely provisioned, and managed. However, the identification, provisioning, and management processes may be difficult to implement, especially when there are devices using different protocols, data formats, data representations, etc. Thus, the inventors recognized a need in the art to support a variety of protocols, data formats, and data representations for devices interconnected in the context of IoT.

Conventional methods for device onboarding, configuration, management, and data acquisition in the context of IoT platforms are complex and expend a large amount of effort (e.g., development or integration efforts). Typical methods also require expertise and specialized skills so that they are not simple and end-user friendly, particularly for users who are not IT specialists. For instance, in industrial applications such as manufacturing or "Industry 4.0," high capacity devices (i.e., employing WiFi or having strong computing power) are available. Also, complex integration projects for customization and adoption of hardware and software for the specific applications are typical and feasible.

However, IoT devices are increasingly being adopted for day-to-day applications, including for laypersons. In these situations, commodity hardware is typically used. Commodity hardware includes wearables, multimedia electronics, home appliances, and the like. In these situations, a user has very little, if any, ability to change a hardware setup or interface provided by the vendor. Thus, the inventors also recognized a need in the art to provide device onboarding, configuration, management and data acquisition methods and systems having simple and end-user friendly user interfaces.

Methods and systems of the present disclosure provide a simplified IoT system and service, including device management for IoT member devices. In embodiments, methods and systems provide acquisition and interpretation of device data to provide value. The acquisition and interpretation of the device data may provide immediate value for a user such as a merchant providing the IoT device for customer use. In an embodiment, a method includes at least one of: onboarding of devices, onboarding of applications, onboarding of services, and definition of an "event condition action" (ECA) rule.

In an embodiment, a method to onboard a component to a network, includes generating adapter code based on the component, the adapter code including an initial credential for an initial registration. The method automatically registers the component based on received information from the component. In response to the registration of the component, the method generates access credentials for subsequent communication between the component and the network. The method establishes a connection between the component and the network.

Figure 1:
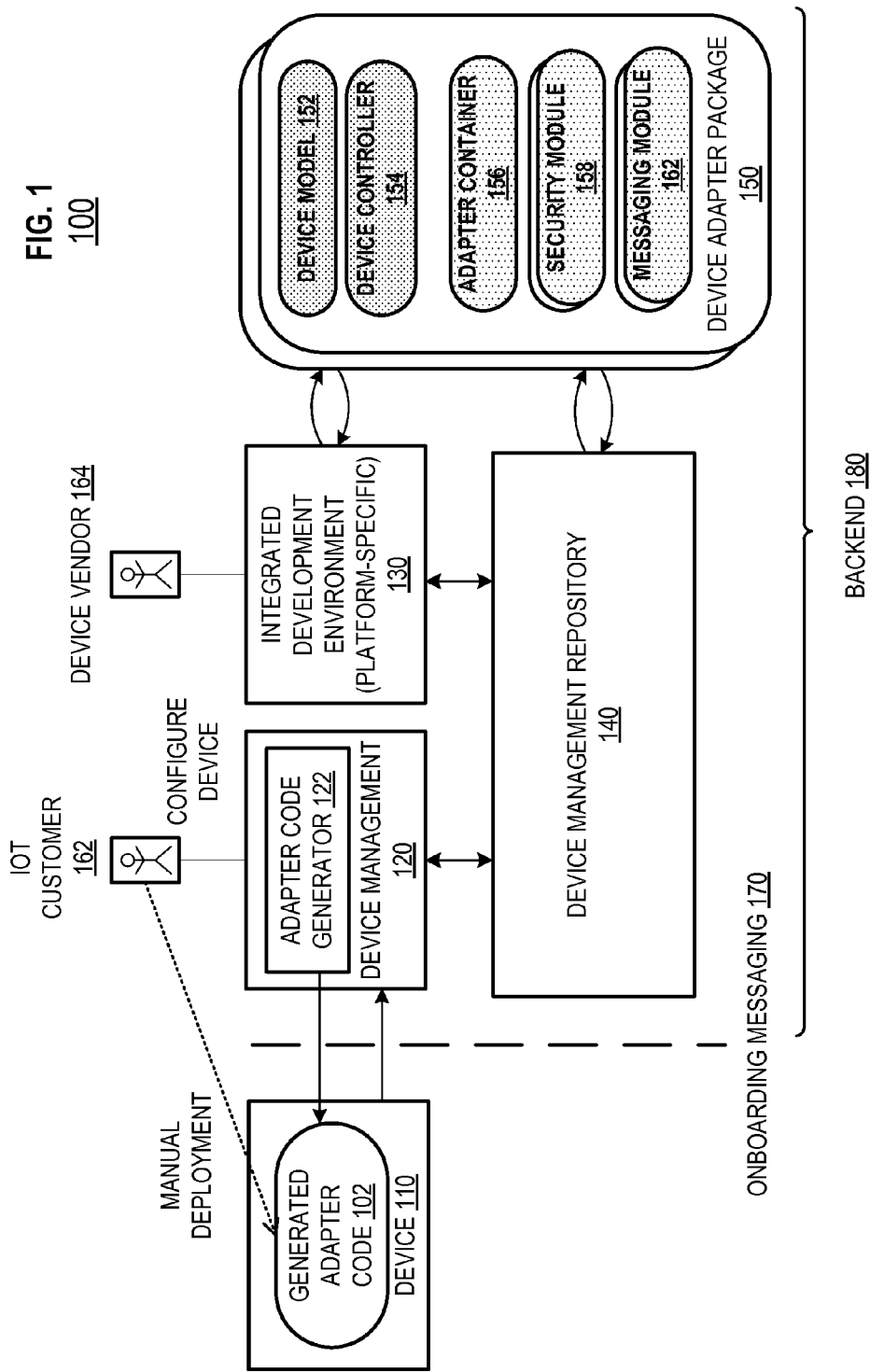
FIG. 1 is a simplified block diagram of an IoT system according to an embodiment.

FIG. 1 is a simplified block diagram of an IoT system 100. The system 100 may include a device 110, an interface 170, and a backend 180. The device 110 may be an IoT-compatible device. By way of non-limiting example, a device may be a hardware device representing a real-world object such as a simple button with a standard communications protocol. Other examples include a home appliance such as refrigerator, a video playback and/or streaming device, and a consumable such as a smart light. The device may include generated adapter code 102. The adapter code may be generated according to methods and systems described herein. The adapter code 102 may facilitate management and/or onboarding of a device, as further described herein. The adapter code may be in a various formats, e.g., in a binary format. The device may be configured according to the methods described herein.

The interface 170 may represent an on-boarding and/or messaging interface between device 110 and backend 180. The interface may include any single or combination of communications networks including a local area network (LAN), a wide area network (WAN), the Internet, a Cloud, and the like.

The backend 180 may include a device management module 120, an integrated development environment (IDE) 130, a device management repository 140, and a device adapter package 150. The device management module 120 may include an adapter code generator 122. The device management module 120 may manage at least one member IoT device to assist in device management functions such as onboarding, data acquisition, etc. The adapter code generator 122 may generate adapter code, which may be used by an IoT member device for communication and analysis. The adapter code generation is further described herein, e.g., with respect to FIG. 2. The backend 180 may be configured according to the methods described herein.

The IDE 130 may provide an environment for users to develop a solution such as a software solution. For example, the IDE may include a source code editor, a build automation tool, and a debugger. The IDE may include a device adapter development kit e.g., a software development kit (SDK). The IDE may be platform-specific. A device vendor 164 may develop and/or manage the IDE.

The device management repository 140 may store, among other things, code and models. In an embodiment, the device management repository 140 may store output from device management module 120 and IDE 130. For example, the device management repository 140 may store code generated by device management repository 120 and/or models representing at least partially developed solutions in the IDE. The device management repository 140 may be implemented by a storage apparatus as further described herein. In an embodiment, the device management repository 140 may store at least one templates, which may be provided by a vendor, and may be usable for onboarding a device, an application, and/or a service.

Figure 2:
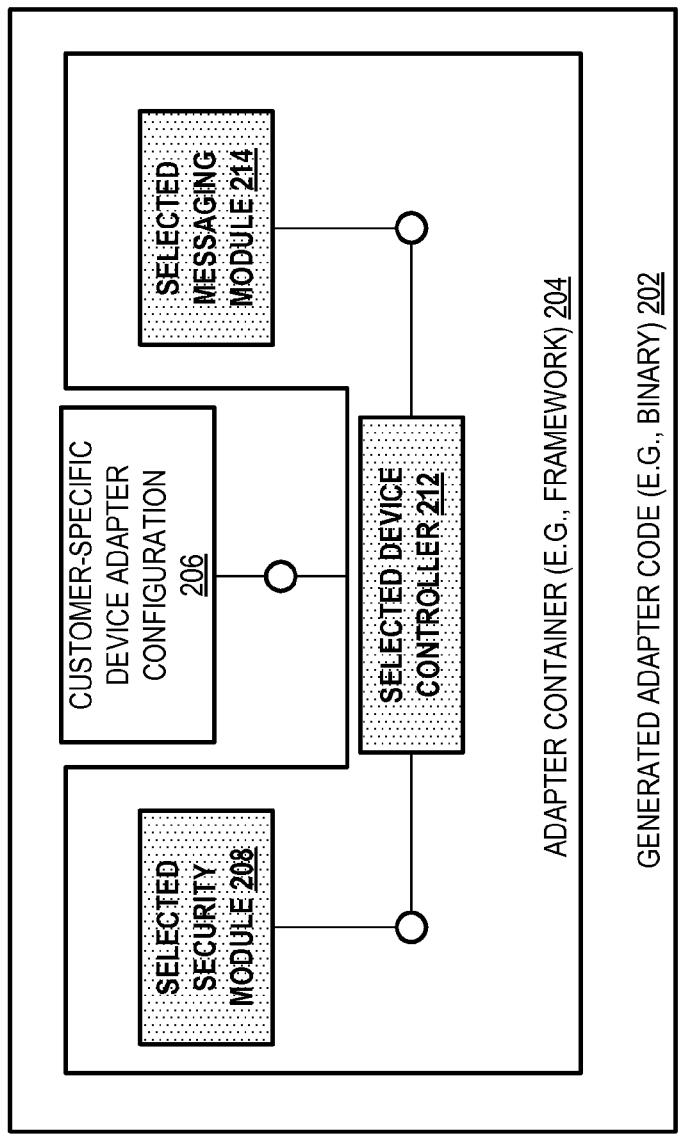
FIG. 2 is a simplified block diagram of generated code according to an embodiment.

The device adapter package 150 may include at least one reusable component and at least one device-specific component. The at least one reusable component may be used for different operating systems, devices, services, applications, and the like. For instance, the at least one reusable component may be used for a group of devices each having a platform compatible with the other devices of the group. The at least one device-specific component may be adapted to various run times. In an embodiment, the at least one reusable component includes a device model 152 and a device controller 154. Device model 152 may represent the device 110, for example including specification of a device or a type of device. For instance, a device model 152 compatible with device 110 may include attributes of device 110. Device controller 154 may include functions for controlling a device or a type of device. For instance, a device controller 154 compatible with device 110 may facilitate control of device 110. In an embodiment, the at least one device-specific component includes an adapter container 156, a security module 158, and a messaging module 162. Security module 158 may include authentication information such as identity and credential(s) (password(s), certificate(s), and the like). Messaging module 162 may include information and/or configuration instructions for communications by the device. In an embodiment, security module 158 and messaging module 162 may be included in adapter container 156. For example, FIG. 2 shows an adapter container 204 including a selected security module 208 and a selected messaging module 214.

System 100 also shows example users, IoT customer 162 and device vendor 164 for purely illustrative purposes. A user may interact with system 100 in other ways. In the example shown in FIG. 1, IoT customer 162 may interact with a device 110 and/or a device management module 120. Device vendor 164 may interact with IDE 130.

In an embodiment, the device management module 120 may be accessible by the IoT customer 162. This may allow the IoT customer 162 to manage the customer's respective device(s). The IDE 130 may be accessible by the device vendor 164. In an embodiment, the IDE 130 may be available for customers or other community members to allow contributions by members of the community. The community may be users who directly or indirectly access the device management repository 140.

In operation, device 110 (also referred to as "target device") may be on-boarded with the aid of backend 180 as follows. A device adapter package 150 may be identified for the target device. The device adapter package 150 may be retrieved from device management repository 140. The device adapter package 150 may be identified based on compatibility with the target device. Compatibility may be determined based on characteristics and specifications of the target device. For instance, a device adapter package 150 may be determined to be compatible with a target device if at least one device specification matches at least one attribute in the device model 152. In an embodiment, the device adapter package 150 may be developed independently. In another embodiment, a portion of a device adapter package 150 from the device management repository 140 may be used for the target device, while another portion is developed specifically for the target device.

At least one device-specific module may be developed. For example, at least one of: the adapter container 156, security module 158, and messaging module 162 may be adapted to device 110. The device adapter package 150 may be communicatively coupled to the IDE 130 and the device management repository 140 to obtain instructions, code, and models, and the like for developing each of the components. That is, each of the components in the device adapter package 150 may be developed based on the information obtained from the IDE 130 and/or device management repository 140. Data associated with each of the components of the device adapter package 150 may be stored in the device management repository 140 and provided to the IDE 130.

The IDE 130 may be developed and/or operated on by a device vendor 164. For example, the device vendor may wish to offer an IoT product to a customer represented by IoT customer 162. The device management module 120 may be configured by a customer 162. For example, a customer using a video playback device may configure the video playback device. The customer may initiate a process to configure the device 110 (represented by the dashed line). The device management module 120 and the IDE 130 may each be communicatively coupled to the device management repository 140. For instance, the device management module 120 and the IDE 130 may each read or write to the device management repository 140.

In one aspect, the device management repository 140 is developed and maintained by an enterprise community. The enterprise community may include those users who directly or indirectly access the device management repository 140. Vendors may have direct or indirect access and may contribute to the device management repository. In an embodiment, the IDE 130 may be available for customers or other community members to allow contributions by members of the community. In an embodiment, the device management module 120 may be accessible by the IoT customer 162. The IDE 130 may be accessible by the device vendor 164. For example, the device management repository 140 may be a marketplace storing collective knowledge developed by various device vendors (represented by 164). For instance, enterprise community members such as device vendors may develop a device adapter packages 150 including at least one reusable component. The reusable component may be used by the community at large by storing the component or its corresponding device adapter package in the device management repository 140.

FIG. 2 is a simplified block diagram of generated code 200. The generated code 200 may onboarding and management of its target device. The code 200 may include generated adapter code 202. In an embodiment, the generated adapter code 202 may be in a binary format. In an embodiment, the generated adapter code 202 may be device-specific, i.e. adapted to be runnable on a specific device. In one aspect, a specific device may be characterized by at least one of a specific: hardware, operating system, programming language, application programming interface (API), and runtime environment. By way of non-limiting example, hardware options include microcontroller and platform; operating system options include Linux® and Windows®; programming language options include Java® and C. The generated adapter code 202 may include a customer-specific adapter configuration 206 and an adapter container 204.

The customer-specific adapter configuration 206 may be compatible with a particular customer and/or device. For example, the configuration may include control of operations and metrics (e.g., credentials) for connecting to a network such as a cloud. Using the example of a video playback device, two customers may each have a same type of a video playback device but may have different interests in video content. They may each have a customer-specific device adapter configuration to obtain different video content based on differing interests.

The adapter container 204 may be a framework. The framework may be generic and not necessarily unique to a device. In an embodiment, the adapter container 204 is pre-installed. The adapter container 204 may include a selected security module 208, a selected device controller 212, and a selected messaging module 214. The selected security module 208 and the selected device controller 212 may be implemented by an API. The selected messaging module 214 may include types and instructions for communications, e.g., a protocol such as HTTP.

In an embodiment, each of the components shown in FIG. 2 is installed in a default mode of operation. This approach may provide flexibility and security. In another embodiment, the device adapter configuration 206 may be installed initially. The initial installation may have the advantage that individual configuration may become obsolete. By way of non-limiting example, a device can be pre-installed or pre-configured in mass deployment scenarios where multiple devices of the same kind are distributed.

In an embodiment, a system provides a set of predefined device(s) and one or more device categories. For each predefined device, coding along with metadata for onboarding and monitoring may be uploaded to a marketplace. The marketplace may be an Internet marketplace. For example, the marketplace may be an integrated internal marketplace that enables customers to position applications on disparate platforms and various sources within their respective enterprises for consumption by employees, partners, and an ecosystem including customers and customers of customers. The marketplace may be represented by the device management repository 140 shown in FIG. 1. The coding and/or metadata may include communication protocol definition and implementation, developing an information model, etc. The coding and/or metadata may be provided by developers.

Figure 3:
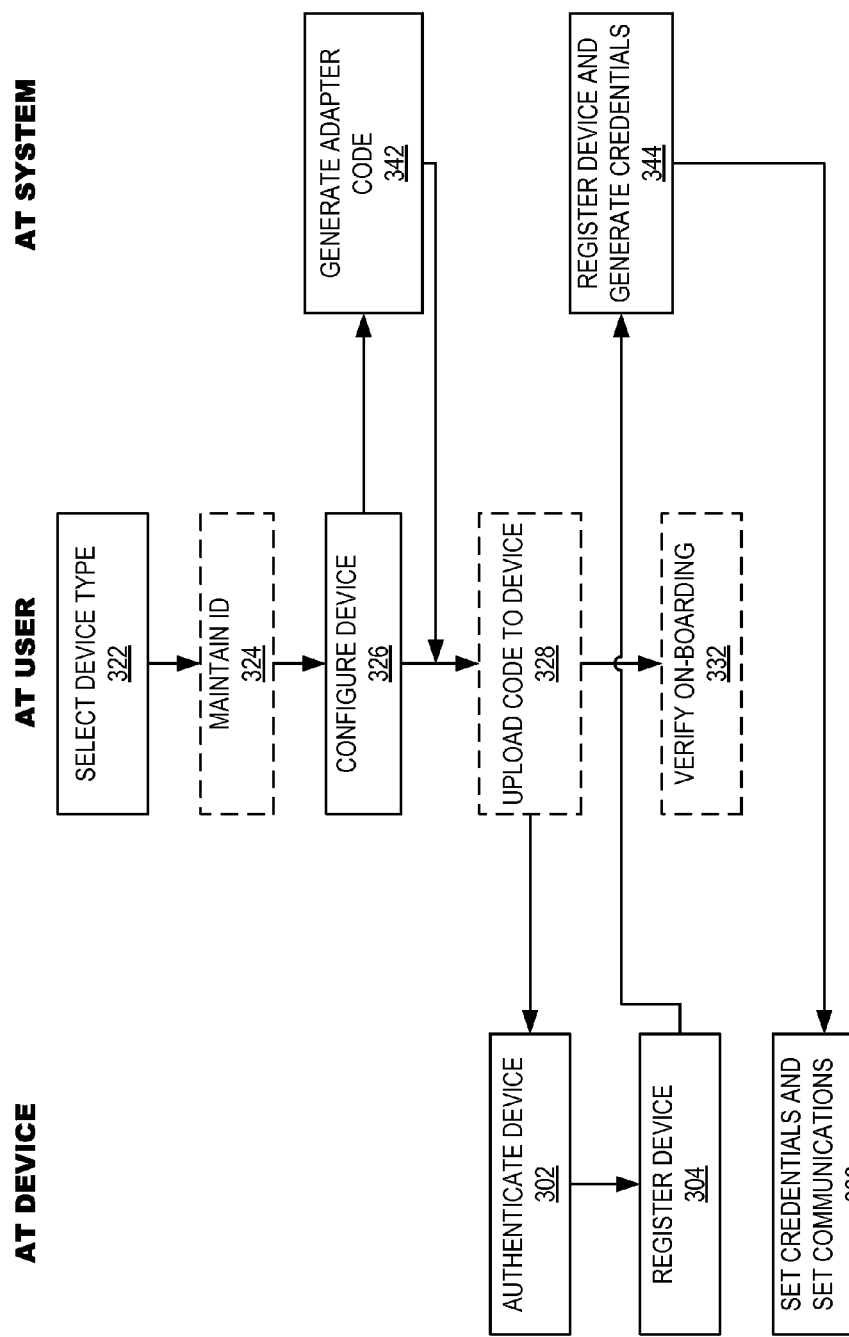
FIG. 3 is a flowchart of a method for onboarding a device according to an embodiment.

FIG. 3 is a flowchart of a method 300 for onboarding a device. Method 300 may include steps forming sub-methods, each of which may be performed by a respective one of a device, a system, and a user. In 322, the user may select the type of the device to be operated on, e.g., for inclusion in an IoT system. The type of device may be a model of a device. In 326, the user may configure the device. This may include configuring capabilities of the device such as status of read recording and switching the device on or off. In an embodiment, at least a portion of this information may be received in response to a query to the user at the device, such as device 110 shown in FIG. 1.

Returning to FIG. 3, in response to the configuration of the device in 326, a system may generate corresponding adapter code (342). In an embodiment, the system includes at least a portion of system 100 shown in FIG. 1. In particular, the adapter code may be generated by adapter code generator 122. The adapter code may include metadata and credentials. The metadata may include an information model, a configuration, a credential, and the like. The credentials, which may be a certificate, a username, a password, a token, or the like, may be used for initial registration. The type of credential generated may correspond to a support mechanism in an underlying device or system. In an embodiment, the system may automatically configure a most extensive security configuration supported by the device for which the adapter code is generated. For example, the security configuration may include authentication (e.g., certificates, username/password, token, etc.) and transport-layer security (e.g., encrypted vs. unencrypted protocol). In an embodiment, a security feature, such as a secret, for an initial registration is included in the configuration.

The generated adapter code may then be provided to a user and/or a device. This is represented in FIG. 1 by showing device 110 in a state after generated adapter code 112 has been provided to the device. Based on the generated adapter code, the device may be authenticated in 302. The authentication may include using a security feature included in the generated adapter code for an initial registration, as discussed herein. The authentication in this step may be more secure compared with typical user authentication procedures. For example, the authentication may be based on a certificate rather than or in addition to an identification (ID).

In an embodiment, upon execution of the code, the device may automatically begin to register itself. For example, the device may transmit data to the system to complete the registration process. Based on the received information, the system may register the device in 344. For instance, the system may register the device to the cloud so that the device becomes a functional IoT member device. The system may generate individual credentials for subsequent communication and return the generated individual credentials to the device and/or the user (344). The individual credentials generated and provided by the system may provide a further layer of security because the credential may be disposable and more difficult to guess than a static password. In 306, the device may set individual credentials. For example, the setting of the individual credentials may be based on the credentials generated and provided by the system in 344. In 306, the device may establish a connection for data transfer. The connection may be of a variety of forms. By way of non-limiting example, the connection may be a bidirectional connection permitting sending and receiving information from the device to the device management and from the device management to the device. Furthermore, operations like reading, creating, updating and deleting information may be enabled. In one aspect, the connection may be bi-directional, allowing for two-way communication between a device and a device management system. In another aspect, the connection may support various operations, including reading, creating, updating, and deleting.

In contrast to conventional methods, the process described herein enables complete device onboarding for a set of devices. For instance, at least a portion of the functionality may be offered by a device management system via an Internet API. The set of devices may share one or more features such as a processing or memory characteristic. A type of video playback device may be considered a set of devices based on shared characteristics.

Method 300 may include at least one optional step. In an optional first step, a user may be begin by providing authenticating credentials at the device management system (not shown). For example, the authentication credentials may be provided to device 110 shown in FIG. 1. Returning to FIG. 3, in optional step 324, the user may maintain a unique identification (ID) for authentication in a network. For example, the ID may be an IP address, a MAC address, and the like. The user may provide an ID or confirm a system-generated ID. This information may be retrieved automatically via network services.

In optional step 328, the generated adapter code is provided via a user. In an embodiment, the user uploads the code to the device (328). The user may upload the generated code to the device following a device-specific procedure. In optional step 332, the user, in conjunction with the device and the system, may verify successful onboarding. For example, once the device is maintained, a check may be performed and a user may be notified about success or failure of an onboarding process. As another example, the user may review a device status and provide this information to the system. This provides a vendor with an ability to program and/or deploy devices.

In the context of IoT, a service or an application may provide an interface for communication. In other words, a service or an application may be on-boarded in a manner similar to onboarding of devices. An example for a service is sending of an email. An application may be a visualization of health data such as heart beat. For instance, representational state transfer (REST), which is a software architecture style including guidelines and best practices for creating scalable web services, may be used for consumption or data acquisition of a services or/and applications.

Figure 4:
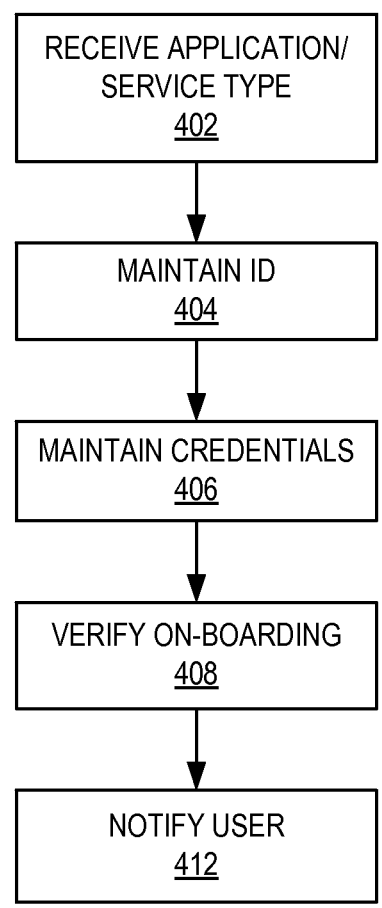
FIG. 4 is a flowchart of a method for onboarding an application and/or a service according to an embodiment.

FIG. 4 is a flowchart of a method 400 for onboarding an application and/or a service. Method 400 finds application in onboarding of an application and/or service to a cloud. The method 400 may be performed by a device management system such as the system 100 shown in FIG. 1. Method 400 is described herein for an application, but the concepts apply equally to a service.

In 402, the method may begin by receiving an application type. For instance, the application type may be based on an application selected by a user. The received information may include a description of the interface to be on-boarded and/or managed, communication options, etc. The interface may be onboarding/messaging interface 170 shown in FIG. 1. The user may provide a unique identifier and/or address (e.g., IP address or domain). Using an example of a service, such as an email service, additional credentials may be used. Using an example of an application, the application may be installed on a mobile device.

In 404, method 400 may maintain an ID. The ID may be a unique ID for authentication in a network. For example, the ID may be an IP address, a MAC address, and the like. The user may provide an ID or confirm a system-generated ID. This information may be retrieved automatically via network services. In 406, the method 400 may maintain a credential. The credential may be a user credential or other type of credential. Maintaining the credential may facilitate management of access rights. For instance, the system may register the application to the cloud so that the application becomes a functional IoT member application. The system may generate individual credentials for subsequent communication and return the generated individual credentials to the application and/or the user (406). The individual credentials generated and provided by the system may provide a further layer of security because the credential may be disposable and more difficult to guess than a static password.

In 408, the method may verify on-boarding. For instance, the user, in conjunction with the application and the system, may verify successful onboarding. For example, once the application is maintained, a check may be performed and a user may be notified about success or failure of an onboarding process. As another example, the user may review an application status and provide this information to the system. This provides a vendor with an ability to program and/or deploy applications. In 412, the method 400 may notify a user that the process is complete. In an embodiment, method 400 may alert the user to any anomalies, errors, and/or other information related to the onboarding process.

In an embodiment, a developer or a service provider may upload an application or service and underlying logic. For each predefined application or service, coding along with metadata for onboarding and monitoring may be uploaded to a marketplace. The marketplace may be an Internet marketplace. For example, the marketplace may be an integrated internal marketplace that enables customers to position applications on disparate platforms and various sources within their respective enterprises for consumption by employees, partners, and an ecosystem including customers and customers of customers. The marketplace may be represented by the device management repository 140 shown in FIG. 1. Although called a "device management repository," in embodiments, the repository may store at least one application and/or at least one representation of a service. The coding and/or metadata may include communication protocol definition and implementation, developing an information model, etc. The coding and/or metadata may be provided by developers.

In one aspect, methods and system of the present disclosure provide event, condition, action (ECA) rule definition. An ECA is a short-cut for referring to a structure of a rule in an event driven architecture. An ECA rule may include an event portion, a condition portion, and an action portion. The event portion may specify a signal that triggers an invocation of the rule. The condition portion may be a logical test that, if satisfied or is evaluated to be true, causes the action portion to be carried out. The action portion may consist of updates, invocations, and the like on local data. An ECA rule allows for device(s), service(s), and/or application(s) to be combined as trigger(s) and/or actor(s) in an environment.

In contrast to typical IoT recipes, (i) an ECA rule may be integrated with an IoT member device, application, or service, (ii) an ECA rule may include a time constraint, and (iii) an ECA rule may implement more complex rules. First, an ECA rule may be integrated with an onboarded device, application, and/or service. For example, an action aspect of a rule may be mapped to a particular device. Second, an ECA rule may include a time constraint. Time constraints may cover relative or absolute time predicates such as events occurring before or after a certain time frame, sequences, concurrencies and time boundaries. By way of non-limiting example, a condition may be true once an event occurs within a predefined time frame. Third, an ECA rule may implement a more complex rule than a more simple IFTTT rule. For example, an ECA rule may implement a business rule, which may be more complex than an IFTTT rule, but be simple and easy to use at the same time. For example, a business rule may perform functions on at least one business object, the at least one business object representing an actor in a business process.

Once devices and services are successfully onboarded, a user, method, or system can define simple recipes (i.e., rules) using ECA rule definition. The recipes may be represented as a trigger and action similar to an IFTTT approach. A trigger and action may be represented as one or more symbols and can be managed according to user interface commands such as "drag and drop" to combine recipes.

According to a device type, a definition for each device trigger can be observed and retrieved. Similarly, according to an application or service type, a definition for each application or service trigger can be observed and retrieved. By way of non-limiting example, a service includes a movie being recorded, a device includes a light being switched on, and an application includes an e-mail being received.

In an embodiment, in response to selection of a device, an application, or a service, a user, method, or system can select a trigger and may optionally define at least one parameter. Example parameters include: where the e-mail comes from, a color of a light, and a name of the recorded movie. Conditions can be maintained optionally. For example, time constraints (e.g., when the trigger occurred), specific constraints (e.g., location of the trigger), and the like can be maintained.

In an embodiment, the user can define one action within a recipe which can be selected equally from a device, application, or service. For example, to switch a device such as a video playback device off, the defined action may include deactivating a laser diode or otherwise turning the video playback device off.

Methods and systems of the present disclosure can be applied to a range of small to very large IoT scenarios, reducing a complexity of current approaches and allowing laypersons to operate IoT member devices, applications, and services using simple scenarios. Methods and systems of the present disclosure may be applied in home automation and home multimedia as well as for enterprise scenarios.

The methods and systems described herein have many advantages over conventional methods. For example, the methods and systems described herein are simple and user-friendly. For example, the methods may include template-based onboarding using generated code, recipe-based rules, and the like. The methods and systems described herein are scenario independent and flexible. For example, a device, a service, or an application can be configured an uploaded as a "type," facilitating sharing of onboarding methods based on commonalities between the device, service, or application to be on-boarded. Methods and systems of the present disclosure are dynamic, unlike typical methods and systems. For example, a device is typically provided to an end user in a pre-configured format. By contrast, a device implemented according to the present disclosure is dynamically configured based on a user's preferences and/or needs. Enhanced security compared with typical methods is also provided out of the box. For instance, the authentication process facilitated by the adaptation layer provides an added level of security.

Figure 5:
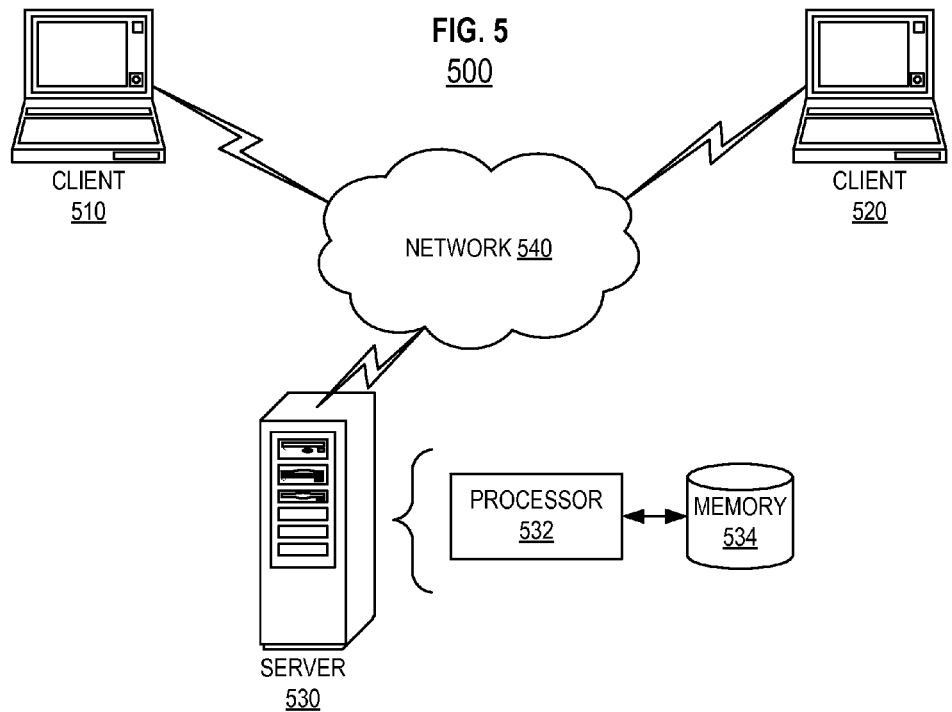
FIG. 5 is a simplified block diagram of a system implementing the methods and systems described herein according to an embodiment.

FIG. 5 is a simplified block diagram of a system 500, which may be used to implement the methods and systems described herein. The system 500 may include a plurality of clients 510, 520 and a server 530 interconnected via network 540. The server may include a processor 532 in communication with a computer-readable medium 534. The computer-readable medium 534 may be a database internal or external to the processor or external storage means. The computer-readable medium 534 may include instructions executable by the processor such that when the processor executes various portions of the instructions, the instructions cause the processor to perform the various methods described herein. Each of the clients 510, 520 can communicate with the processor 532 to request applications stored in the server 530. In an embodiment (not shown), more than one system, for example more than on instance of client 510, can be used to carry out the embodiments of the present disclosure. The more than one instance of client 510 may or may not communicate with each other.

Figure 6:
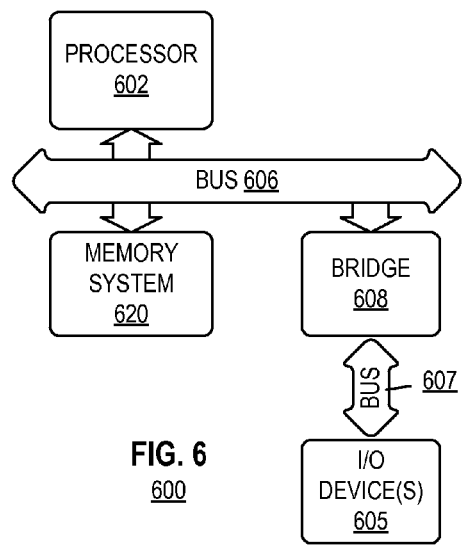
FIG. 6 is a simplified block diagram of a device implementing the methods and systems described herein according to an embodiment.

FIG. 6 is a simplified block diagram of a device 600 implementing the methods and systems described herein. As shown in FIG. 11, the device 600 may include a processor 602, a memory system 620, and at least one input/output (I/O) device 605. The processor may be implemented according to the methods and systems described herein. For example, the processor may be operable for perform the steps of methods 300 and 400 shown in FIGS. 3 and 4.

The processor 602, memory system 620, and I/O device(s) 605 may be communicatively coupled to each other. The communication may be implemented in a variety of ways, e.g., via at least one computer bus 606 and/or bridge device 608. The I/O device(s) 605 may include network adapters and/or mass storage devices from which the device 600 may receive commands for executing the methods described herein. The I/O device(s) 605 may be implemented according to the methods and systems described herein. For example, the I/O device(s) may receive input from a user, e.g., a matching command.

Although the foregoing description includes several exemplary embodiments, it is understood that the words that have been used are words of description and illustration, rather than words of limitation. Changes may be made within the purview of the appended claims, as presently stated and as amended, without departing from the scope and spirit of the disclosure in its aspects. Although the disclosure has been described with reference to particular means, materials and embodiments, the disclosure is not intended to be limited to the particulars disclosed; rather the disclosure extends to all functionally equivalent structures, methods, and uses such as are within the scope of the appended claims.

As used in the appended claims, the term "computer-readable medium" may include a single medium or multiple media, such as a centralized or distributed database, and/or associated caches and servers that store one or more sets of instructions. The term shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium may include a solid-state memory such as a memory card or other package that houses one or more non-volatile read-only memories. Further, the computer-readable medium may be a random access memory or other volatile re-writable memory. Additionally, the computer-readable medium may include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

The present specification describes components and functions that may be implemented in particular embodiments which may operate in accordance with one or more particular standards and protocols. However, the disclosure is not limited to such standards and protocols. Such standards periodically may be superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

For example, operation of the disclosed embodiments has been described in the context of servers and terminals that implement storage apparatus such as databases. These systems can be embodied in electronic devices or integrated circuits, such as application specific integrated circuits, field programmable gate arrays and/or digital signal processors. Alternatively, they can be embodied in computer programs that execute on personal computers, notebook computers, tablets, smartphones or computer servers. Such computer programs typically are stored in physical storage media such as electronic-, magnetic- and/or optically-based storage devices, where they may be read to a processor, under control of an operating system and executed. And, of course, these components may be provided as hybrid systems that distribute functionality across dedicated hardware components and programmed general-purpose processors, as desired.

In addition, in the foregoing Detailed Description, various features may be grouped or described together the purpose of streamlining the disclosure. This disclosure is not to be interpreted as reflecting an intention that all such features are required to provide an operable embodiment, nor that the claimed embodiments require more features than are expressly recited in each claim. Rather, as the following claims reflect, subject matter may be directed to less than all of the features of any of the disclosed embodiments. Thus, the following claims are incorporated into the Detailed Description, with each claim standing on its own as defining separately claimed subject matter.

Also, where certain claims recite methods, sequence of recitation of a particular method in a claim does not require that that sequence is essential to an operable claim. Rather, particular method elements or steps could be executed in different orders without departing from the scope or spirit of the disclosure.

What is claimed is:

1. A computer-implemented method to onboard a component device to a network, the method comprising:
    generating adapter code based on the component device, the adapter code including an initial credential for an initial registration and instructions for onboarding of a service to an Internet of Things (IoT), the adapter code comprising metadata and credentials, the metadata comprising an information model, a configuration, and a credential;
    automatically registering, using the generated adapter code, the component device;
    responsive to the registering the component device, generating access credentials for subsequent communication between the component device and the network; and
    establishing a connection between the component device and the network.

2. The method of claim 1, wherein the generating the adapter code includes generating instructions for onboarding of the component device to an Internet of Things (IoT).

3. The method of claim 2, wherein the generating the adapter code is in response to receiving attributes of the component device, the attributes including: a type of the component device based on a repository; and an identification for the component device.

4. The method of claim 2, wherein the received information from the component device includes authentication information from the component device; and wherein the automatically registering the component device is performed in response to verification of the authentication information.

5. The method of claim 2, further comprising verifying the onboarding by checking a connection between the component device and the network.

6. The method of claim 2, further comprising: responsive to receiving a command, triggering an action by the component device, the triggered action being carried out in accordance with an event command action (ECA) rule.

7. The method of claim 6, wherein the ECA rule is a business rule.

8. The method of claim 6, wherein the ECA rule includes a time constraint.

9. The method of claim 1, wherein the initial credential is a certificate.

10. The method of claim 1, wherein the generating the adapter code includes generating instructions for onboarding of an application to an Internet of Things (IoT).

11. The method of claim 1, wherein the generating the adapter code is based on template adapter code received from a marketplace, the template adapter code including at least one of: an adapter container, a security module, and a messaging module.

12. A system to onboard a component device to a network, the system comprising: at least one programmable data processor; and
    memory storing instructions which, when executed by the at least one programmable data processor, result in operations comprising:
        generating adapter code based on the component device, the adapter code including an initial credential for an initial registration and instructions for onboarding of a service to an Internet of Things (IoT), the adapter code comprising metadata and credentials, the metadata comprising an information model, a configuration, and a credential;
        automatically registering, using the generated adapter code, the component device;
        responsive to the registering the component device, generating access credentials for subsequent communication between the component device and the network; and
        responsive to the generating access credentials, establishing a connection between the component device and the network.

13. The system of claim 12, wherein the generating the adapter code includes generating instructions for onboarding of the component device to an Internet of Things (IoT).

14. The system of claim 13, wherein the generating the adapter code is in response to receiving attributes of the component device, the attributes including: a type of the component device based on a repository; and an identification for the component device.

15. The system of claim 13, wherein the received information from the component device includes authentication information from the component device; and wherein the automatically registering the component device is performed in response to verification of the authentication information.

16. The system of claim 13, wherein the operations further comprise: verifying the onboarding by checking a connection between the component device and the network.

17. The system of claim 13, wherein the operations further comprise: responsive to receiving a command, triggering an action by the component device, the triggered action being carried out in accordance with an event command action (ECA) rule.

18. The system of claim 12, wherein the initial credential is a certificate.

19. The system of claim 12, wherein:
the generating the adapter code includes generating instructions for onboarding of an application to an Internet of Things (IoT);
the generating the adapter code is based on template adapter code received from a marketplace, the template adapter code including at least one of: an adapter container, a security module, and a messaging module.

20. A non-transitory computer program product to onboard a component to a network, the computer program product storing instructions which, when executed by at least one programmable data processor forming part of at least one computing device, result in operations comprising:
generating adapter code based on the component device, the adapter code including an initial credential for an initial registration and instructions for onboarding of a service to an Internet of Things (IoT), the adapter code comprising metadata and credentials, the metadata comprising an information model, a configuration, and a credential;
automatically registering, using the generated adapter code, the component device;
responsive to the registering the component device, generating access credentials for subsequent communication between the component device and the network; and
responsive to the generating access credentials, establishing a connection between the component device and the network.

\* \* \* \* \*